United States Patent [19]

Keller

[11] Patent Number: 5,019,447

[45] Date of Patent: May 28, 1991

[54] ORIENTED POLYPROPYLENE FILM STRUCTURE

[75] Inventor: Lajos E. Keller, Luxemburg, Luxembourg

[73] Assignee: Mobil Oil Corporation, Fairfax, Va.

[21] Appl. No.: 453,136

[22] Filed: Dec. 12, 1989

Related U.S. Application Data

[63] Continuation of Ser. No. 178,994, filed as PCT US87/00879 on Apr. 16, 1987, abandoned.

[30] Foreign Application Priority Data

Apr. 18, 1986 [GB] United Kingdom ............... 8609550

[51] Int. Cl.$^5$ ............................................. B32B 5/16
[52] U.S. Cl. ................................. 428/327; 428/461; 428/516; 428/518; 428/483; 428/520
[58] Field of Search .............. 428/516, 518, 461, 520, 428/327, 910

[56] References Cited

U.S. PATENT DOCUMENTS

| | | | |
|---|---|---|---|
| 4,211,326 | 7/1980 | Hein et al. | 428/518 X |
| 4,363,841 | 12/1982 | Snow | 428/518 X |
| 4,690,865 | 9/1987 | Fong | 428/518 X |

*Primary Examiner*—P. C. Sluby

[57] ABSTRACT

An oriented polypropylene film structure comprises an oriented polypropylene base layer and a layer of a vinylidene chloride polymer on at least one surface of the base layer or on an intermediate layer, the vinylidene chloride polymer layer being substantially free of migratable emulsifier. A metal layer is provided directly on the vinylidene chloride polymer layer.

7 Claims, No Drawings

ORIENTED POLYPROPYLENE FILM STRUCTURE

This application is a continuation of U.S. Ser. No. 178,994, filed as PCT US87/00879 on Apr. 16, 1987, and now abandoned.

This application relates to polypropylene films, and more especially to metallized, oriented polypropylene films and to their manufacture.

Oriented polypropylene (OPP) films find wide use as packaging materials, and are frequently coated on one or both sides to improve their heat-seal characteristics and their resistance to the transmission of oxygen, water vapor and other gases. Various types of metallized OPP films have also been proposed for packaging purposes and have the advantages of being highly resistant to the transmission of both light and water vapor, and of having a certain aesthetic appeal.

Metallized, coextruded OPP films (polypropylene sandwiched between the coextruded-propylene copolymer layers, oriented and then metallized) are used almost exclusively in laminate structures, primarily in the packaging of snack foods because of their impermeability to light and water vapor and relatively good oxygen barrier properties. However, such metallized films lose their ability to be printed, laminated, lacquered or otherwise treated on the metal surface, within a short time after metallization.

Metallized films have also been manufactured from acrylic coated OPP films and certain vinyl coated OPP films. Such metallized films have enhanced brilliance compared to those based on coextruded OPP films but their oxygen barrier properties are improved only slightly and they may exhibit even worse water vapor transmission rates. Improved oxygen barrier properties can be obtained using an OPP film which is coated on one side with PVdC (polyvinylidene chloride) and which is metallized on the other side through the intermediary of an acrylic coating or an epoxy primer. However, only a modest increase in oxygen barrier properties can be obtained in this way and that increase can be adhesively affected by the solvents used in subsequent processing, for example, printing, laminating and lacquering.

Attempts have been made to metallize OPP films on a PVdC coating since such coatings are widely used to provide films with excellent oxygen barrier properties. Moreover, it is known that metallization of a PVdC surface results in better oxygen barrier properties than metallization of an acrylic or primer coating. However, the bond between the metal and the PVdC tends to be extremely weak, unless the metal coating is applied immediately after the PVdC coating so that the PVdC is then still in an essentially amorphous state, or unless the PVdC coating is subjected to corona discharge immediately before metallization. In either case, however, improved metal adhesion is not lasting and the metallized film tends to have poor gloss and exhibit a spotty, chalky white haze and be of no commercial value.

For these reasons, where very high oxygen barrier properties are required in various packaging applications, metallized polyethylene terephthalate (PET) films and aluminum foil have found wide acceptance. Metallized PET has such good oxygen barrier properties as a result of the PET having a very smooth surface which enables the metal to be deposited as a continuous layer. In contrast, OPP and acrylic coatings have rough surface topographies so that shadow effects are created during metallization and a non-continuous metal layer is formed, resulting in poorer oxygen barrier properties and allowing solvent to penetrate beneath the metal layer thereby eroding the metal adhesion and further reducing the gas barrier properties.

The present invention seeks to provide a metallized PVdC-coated, OPP film having excellent oxygen and water vapor barrier properties, exhibiting high gloss and in which the metal layer is firmly anchored to the PVdC layer to which it is applied.

In accordance with the invention, there is provided an oriented polypropylene film structure comprising:
   an oriented polypropylene polymer base layer;
   a layer of a vinylidene chloride polymer on at least one surface of the base layer or on an intermediate layer; and
   a metal layer applied directly to the vinylidene chloride polymer layer;
wherein the vinylidene chloride polymer layer contains little or no migratable emulsifier.

The film structure of the invention exhibits improved adhesion between the PVdC layer and the metal layer as compared with that obtained using a conventional PVdC coating containing a migratable emulsifier. It is believed that this results from the tendency of the emulsifiers in a conventional PVdC coatings to migrate to the external surface of the PVdC coating during crystallization of the coating. In addition, the film structure of the invention exhibits improved gloss and oxygen and water vapor barrier properties as compared with conventional metallized PVdC-coated, OPP films.

Generally, the amount of migratable emulsifier, if any, that is present in the vinylidene chloride polymer layer is less than 10% of that present in conventional vinylidene chloride polymer layers and preferably is less than 0.3%, and more preferably less than 0.1% by weight of the latex.

Preferably, the oriented polypropylene base layer carries on its other surface or on the surface of an intermediate layer applied thereto, a layer of an acrylic polymer. It is to be appreciated that the term "migratable emulsifier" is used herein to denote an emulsifier which does not become chemically bonded to the vinylidene chloride polymer and hence is free to migrate to the surface of the PVdC layer during crystallization. Such migratable emulsifiers are typically anionic species, such as the sodium salt of $C_{12}$–$C_{18}$ alkylsulfoacid, and serve to disperse and control polymerization of the vinylidene chloride. In accordance with the present invention, most or all of the migratable emulsifier is replaced by a reactive surface active material, preferably in the form of a monomer which becomes bonded to the PVdC coating and most preferably is in the form of a sulfoalkyl ester of an alpha, beta-ethylenically unsaturated carboxylic acid, such as sulfoethyl acetate or sodio sulfoethyl methacrylate. Thus, a preferred PVdC latex is that described in G.B. Patent 1,312,051 as comprising:

(A) 70 to 95% by weight of vinylidene chloride;
(B) 0.5 to 30% by weight of hydroxyalkyl ester of an alpha, beta- ethylenically unsaturated-carboxylic acid (as an internal wetting agent);
(C) 0.3 to 3% by weight of sulphoalkyl ester of an alpha, beta- ethylenically unsaturated acid;
(D) 0 to 5% by weight of ethylenically unsaturated carboxylic acid; and (E) up to 29.5% by weight of ethylenically unsaturated monomer containing no free acid or hydroxy alkyl groups and other than (A), (B), (C) or (D);

monomer (E) being present together with the other monomers to prevent premature crystallization of the copolymer prior to application and to impart flexibility and heat-sealing properties to the dried copolymer, and at least 2% by weight in total of monomers (B) and (E) together being present in the copolymer to prevent premature crystallization of the copolymer. Other details of the above latex are as described in G.B. Patent 1,312,051, and in related U.S. Pat. Nos. 3,714,106 and 3,850,726.

The PVdC latex can be formulated with waxes and silica, for example, in the amounts normally used to provide the required slip, anti-blocking and heat-seal jaw release properties without adversely affecting metal adhesion, oxygen barrier properties or the ability of the metal layer to withstand further processing. The latex can be applied by any method used in commercial coating processes for such purposes, but reverse gravure coating provides excellent coating quality. As is conventional in the application of PVdC coatings, the latex may be applied to a primer coating such as PEI (polyethyleneimine), which is itself applied to the OPP base film, although the latter may been initially treated to provide surface oxidation, for example by corona discharge or flaming.

The resultant PVdC layer will have the usual properties required of a crystalline PVdC film coating, that is to say the required oxygen barrier, optical, coefficient of friction, anti-blocking and heat-sealing properties. The PVdC also suitably has a high surface polarity so that metal adhesion is further enhanced.

Metallization is carried out by vacuum deposition directly on the PVdC layer, generally using aluminum, zinc or gold. As is conventional in the art, metallization is conducted after crystallization of the PVdC layer is complete which normally requires 7–14 days.

The base layer of OPP can be mono- or biaxially oriented and may consist of a propylene homopolymer or of a copolymer of propylene and a minor amount of a comonomer, for example ethylene. Alternatively, it may consist of a coextruded propylene homopolymer core and ethylene-propylene copolymer skin layers. Still further, it may consist of a extruded core of homopolypropylene containing particles of a higher-melting polymer such as a polyester which, upon orientation of the film, initiates the formation of voids in the core layer, and skin layers of propylene homopolymer. The voids formed in the core layer of such a film structure produce a white opaque and opalescent effect in the film and such a film is available commercially under the registered Trade Mark "Oppalyte".

The metallized OPP films according to the invention have extremely low water vapor and oxygen transmission rates and exhibit exceptional brilliance, properties that previously could only be attained with the metallized PET films. In addition, adhesion between the metal layer and the underlying PVdC layer is extremely strong.

The metallized OPP films according to the invention are receptive to ink on their metallized surface and have excellent heat-sealing properties by virtue of their preferred reverse acrylic coating. They can also be laminated with other films and film structures, as illustrated by the following Examples.

EXAMPLE 1

Four film samples were prepared as follows:

(a) a coextruded film of homopolypropylene having a 3.5% ethylene/96.5% propylene copolymer heat-sealable skin on each side with each skin layer constituting 5% of the total film thickness was biaxially oriented and had a final thickness of 20 $\mu$m. An aluminum coating of 2 ohms resistance was applied by vacuum deposition to one side of the film.

(b) a homopolypropylene film was biaxially oriented, corona discharge treated, treated with a polyethyleneimine primer and acrylic coated on both sides. One side was then coated by vacuum deposition with aluminum to a thickness corresponding to 2 ohms resistance. The final film had a thickness of 21 $\mu$m.

(c) a homopolypropylene film was treated in the manner described in (b) above except that one side of the primed film was coated with acrylic polymer and the other side of the primed film was coated with a conventional PVdC latex and the aluminum layer was vacuum deposited on the acrylic coating. The final film had a thickness of 21 $\mu$m.

(d) a homopolypropylene film was treated in the manner described in (c) above except that the PVdC was prepared as described in G.B. Patent 1,312,051 and was applied in an amount of 3 g/m$^2$, and the aluminum layer was applied by vacuum deposition to the PVdC layer. The final layer film has a thickness of 21 $\mu$m.

All four films were tested for oxygen and water vapor transmission (at 38° C. and 90% relative humidity) and the following results were obtained.

| Film | Oxygen transmission cm$^3$/m$^2$/24 hours | Water vapor transmission g/m$^2$/24 hours |
|---|---|---|
| (a) | 50–100 | 1.5 |
| (b) | 50 | 3.5 |
| (c) | 14 | 2.8 |
| (d) | 1 | 1.2 |

Film (d) according to the invention quite clearly has superior oxygen and water vapor barrier properties and, as a thin gauge film, is useful in the manufacture of laminate structures to replace metallized PET, aluminum foil and other high barrier films.

EXAMPLE 2

Various films incorporating OPP film structures according to the invention were prepared as follows:

(a) a multilayer laminated film, manufactured by adhesively bonding two separate multilayer films, and that was suitable for use on all automatic packaging machines had the following structure:

acrylic coating
OPP base layer
acrylic coating
reverse printing
adhesive
metal layer
PVdC coating
OPP base layer
acrylic coating (b) a laminate for packaging high density goods had the following structure:

acrylic coating
OPP base layer
PVdC coating metal layer
adhesive
polyethylene or cast polypropylene (c) a packaging film having particularly good light transmission resistance properties had the following structure:
lacquer coating
print
metal layer
PVdC coating
oppalyte base layer
acrylic coating The lacquer coating can be heat sealable to enable the film to be used in horizontal form and fill applications. Alternatively, the lacquer can be omitted and the metal layer printed with a heat sealable ink which incorporates the heat seal characteristics of the lacquer.

I claim:

1. In an oriented polypropylene film structure which comprises an oriented propylene polymer base layer, a layer of a vinyidene chloride polymer on at least one surface of the base layer and a metal layer applied directly to the vinylidene chloride polymer layer, the improvement comprising employing a vinylidene chloride polymer layer which contains less than 0.3% by weight of migratable emulsifier such that the gloss of the metal layer and the adhesion of the metal layer to vinylidene chloride polymer are improved as compared to those obtained with a vinylidene chloride polymer layer containing more than 0.3% by weight of migratable emulsifier.

2. A film structure as claimed in claim 1 wherein the amount of migratable emulsifier, if any, that is present in the vinylidene chloride polymer layer is less than 0.1% by weight of said layer.

3. A film structure as claimed in claim 1, wherein the vinylidene chloride polymer layer is applied from a latex containing a sulfoalkyl ester of an alpha-beta ethylenically unsaturated carboxylic acid.

4. A film structure as claimed in claim 1 wherein the latex also contains a hydroxyalkyl ester of an alpha-beta ethylenically unsaturated carboxylic acid.

5. A film structure as claimed in claim 1 wherein a primer coating is provided between the base layer and the vinylidene chloride polymer layer.

6. A film structure as claimed in claim 1 wherein a layer of an acrylic polymer is applied to the other surface of the base layer.

7. A film structure as claimed in claim 1 wherein the polypropylene base layer includes particles of a polymer having a height melting point than polypropylene and contained in voids produced upon orientation of the base layer so that said base layer is substantially opaque.

* * * * *